United States Patent [19]

Barris et al.

[11] Patent Number: 5,834,389
[45] Date of Patent: Nov. 10, 1998

[54] CERAMIC MATERIAL

[75] Inventors: Glen Clifton Barris, Wellington; Carolyn Mary Sheppard, Lower Hutt, both of New Zealand

[73] Assignee: Industrial Research Limited, Lower Hutt, New Zealand

[21] Appl. No.: 848,155

[22] Filed: Apr. 29, 1997

[30] Foreign Application Priority Data

May 1, 1996 [NZ] New Zealand ............................ 280375

[51] Int. Cl.$^6$ ........................ C04B 35/597; C04B 35/599
[52] U.S. Cl. ........................ 501/96.5; 501/98.1; 501/98.3; 423/325
[58] Field of Search ................... 501/98.1, 98.3, 501/96.5; 423/325

[56] References Cited

U.S. PATENT DOCUMENTS

| | | |
|---|---|---|
| 4,506,021 | 3/1985 | Kenneth et al. . |
| 4,913,408 | 4/1990 | Hoggard et al. ........................ 501/98.1 |
| 4,935,389 | 6/1990 | Umebayashi et al. .................. 501/98.1 |

FOREIGN PATENT DOCUMENTS

| | | |
|---|---|---|
| 0 247 878 A1 | 12/1987 | European Pat. Off. . |
| WO95/33700 | 12/1995 | WIPO . |

OTHER PUBLICATIONS

Barris, G., et al, "O'–Sialon–Silicon Carbide Refractories for use in the Aluminium Industry", *Proceedings IPENZ Annual Conference*, 1996 2 319–324.

Barris, G., et al, "Ceramic Production Process", Patent NZ 287952, AU 26846/95, CA 21+1771, EU 9592201.2, JP 8–500708, KR 96–706901, PE 9503274, SA 95/9197, US 08/750272, Jun. 6, 1994.

International Centre for Diffraction Data (ICDD) X–ray diffraction data file number 46–382; no date.

Lindquist, et al, entitled "Structural Changes in O'–Sialons, $Si_{2-x}Al_xN_{2-x}O_{1-x}$, $0.04 \leq x \leq 0.04$", *Acta Cryst.* (1991) B47, 672–678; no month.

Yamagishi, C., Tokyo Institute of Technology, Ph.D. Dissertation 1994, pp. 200–207; no date no month.

Yamagishi, C., et al, Preparation of Sialon Powder by Carbothermal Reduction and Nitridation (2)–Preparation of Z=O Z=5–1.0 Sialon, *Funtai oyobi Funmatsu Yakin*, 1993 40 (12), pp. 1218–1222; no date no month.

Yamagishi, C., et al, "Synthesis of β–SiAlON Powder by Carbothermal Reduction and Nitridation (3)–Reaction Process of β–SiALON (Z=3)", *Funtai oyobi Funmatsu Yakin* 1994 41 (2), pp. 188–192. no date no month.

*Primary Examiner*—Karl Group
*Attorney, Agent, or Firm*—Breiner & Breiner

[57] ABSTRACT

The invention is directed to a silicon oxynitride ceramic material characterised by the following relative intensities and d spacings for the most intense X-ray powder diffraction peaks:

| dÅ | I |
|---|---|
| 4.421 | 66 |
| 3.414 | 39 |
| 3.329 | 100 |
| 2.686 | 24 |
| 2.416 | 51 |
| 2.273 | 26 |

18 Claims, 14 Drawing Sheets

Figure 2

| New Material | | Si₂N₂O | | O'-SiAlON (x = 0.16) | | h k l |
|---|---|---|---|---|---|---|
| d (Å) | I | d (Å) | I | d (Å) | I | |
| | | 4.6596 | 65 | 4.677 | 48 | 1 1 0 |
| 4.421 | 66 | 4.4379 | 100 | 4.449 | 73 | 2 0 0 |
| 3.414 | 39 | | | | | |
| 3.329 | 100 | 3.3669 | 85 | 3.368 | 100 | 1 1 1 |
| 2.686 | 24 | 2.7452 | 15 | 2.748 | 26 | 0 2 0 |
| | | 2.6062 | 20 | 2.610 | 67 | 3 1 0 |
| 2.416 | 51 | 2.4256 | 20 | 2.428 | 73 | 0 0 2 |
| | | 2.3901 | 30 | 2.391 | 67 | 0 2 1 |
| 2.273 | 26 | 2.2945 | 10 | 2.299 | 45 | 3 1 1 |
| | | 2.2118 | 5 | | | 4 0 0 |
| | | 2.1489 | 10 | 2.155 | 18 | 1 1 2 |
| | | | | 2.133 | 9 | 2 0 2 |
| | | 2.1007 | 15 | 2.107 | 29 | 2 2 1 |
| | | 1.8158 | 10 | 1.8200 | 16 | 0 2 2 |
| | | 1.7898 | 15 | 1.7945 | 25 | 1 3 0 |
| | | 1.7730 | 10 | 1.7779 | 24 | 3 1 2 |
| | | 1.6860 | 15 | 1.6924 | 27 | 5 1 0 |
| | | 1.6247 | 5 | 1.6293 | 14 | 4 2 1 |
| | | 1.5946 | 15 | 1.5984 | 41 | 5 1 1 |
| | | 1.5565 | 15 | 1.5588 | 34 | 3 3 0 |
| | | 1.5271 | 20 | 1.5304 | 23 | 1 1 3 |
| | | 1.4788 | 10 | 1.4829 | 31 | 6 0 0 |
| | | 1.44090 | 10 | 1.4435 | 24 | 1 3 2 |
| | | 1.39152 | 20 | 1.3953 | 53 | 0 2 3 |
| | | 1.37247 | 15 | 1.3761 | 55 | 3 1 3 |
| | | | | 1.3312 | 30 | 2 2 3 |
| | | 1.32013 | 5 | 1.3229 | 16 | 0 4 1 |
| | | 1.31028 | 20 | 1.3126 | 46 | 2 4 0, 3 3 2 |
| | | 1.27355 | 5 | 1.2766 | 11 | 5 3 0 |
| | | | | 1.2671 | 12 | 2 4 1 |
| | | | | 1.2655 | 15 | 6 0 2 |
| | | 1.25800 | 15 | 1.2602 | 49 | 6 2 1 |
| | | 1.21159 | 2 | 1.2146 | 7 | 0 0 4 |
| | | 1.19569 | 5 | | | 0 4 2 |
| | | 1.16763 | 5 | 1.1700 | 19 | 5 1 3 |
| | | 1.15303 | 2 | 1.1551 | 8 | 2 4 2 |
| | | 1.12804 | 2 | 1.1304 | 11 | 5 3 2 |
| | | 1.09894 | 1 | | | 3 1 4 |

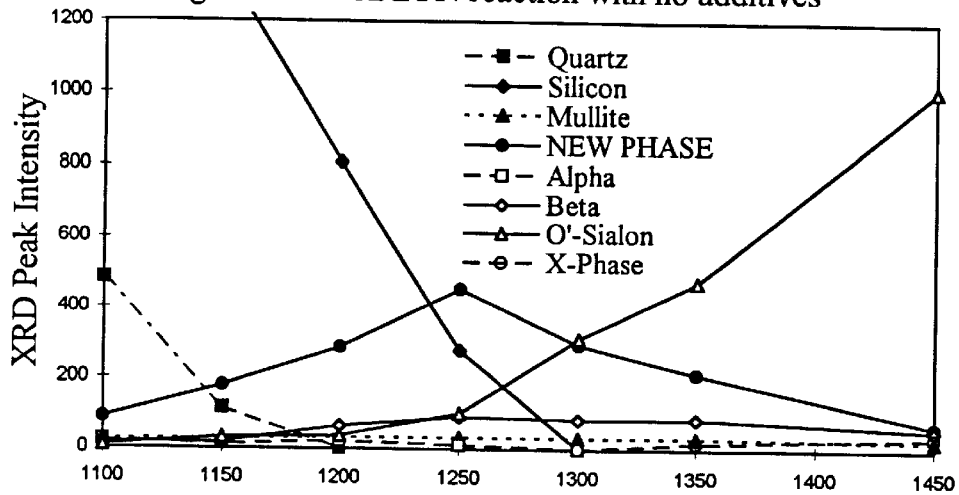
Figure 4a  O'-SiAlON reaction with no additives
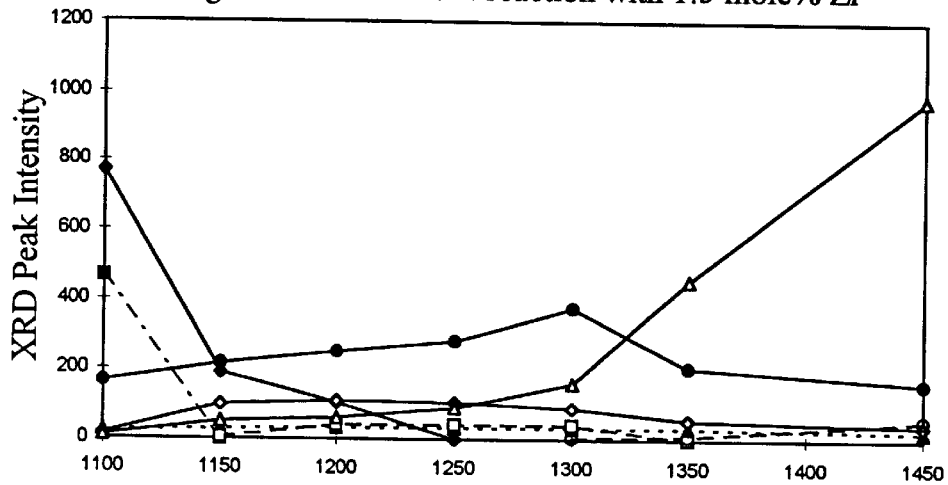
Figure 4b  O'-SiAlON reaction with 1.5 mole% Zr
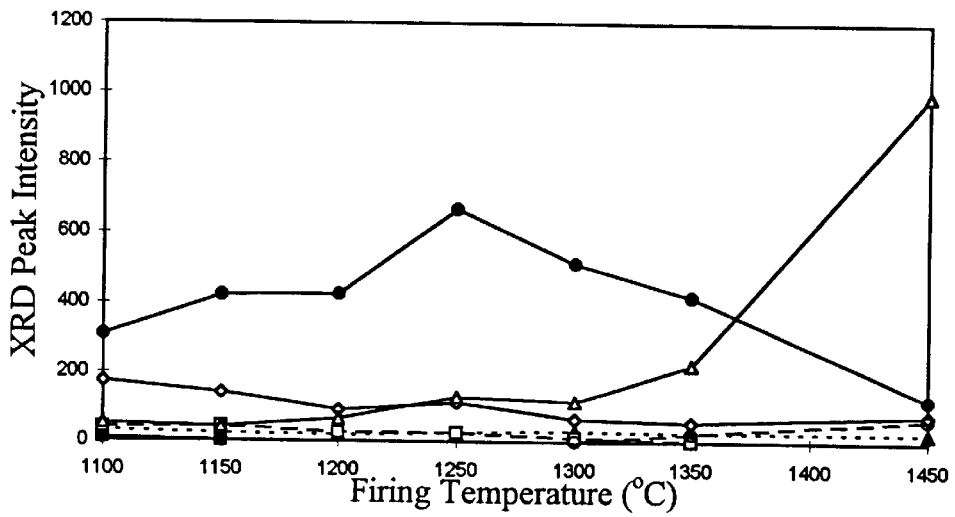
Figure 4c  O'-SiAlON reaction with 1.5 mol% Fe

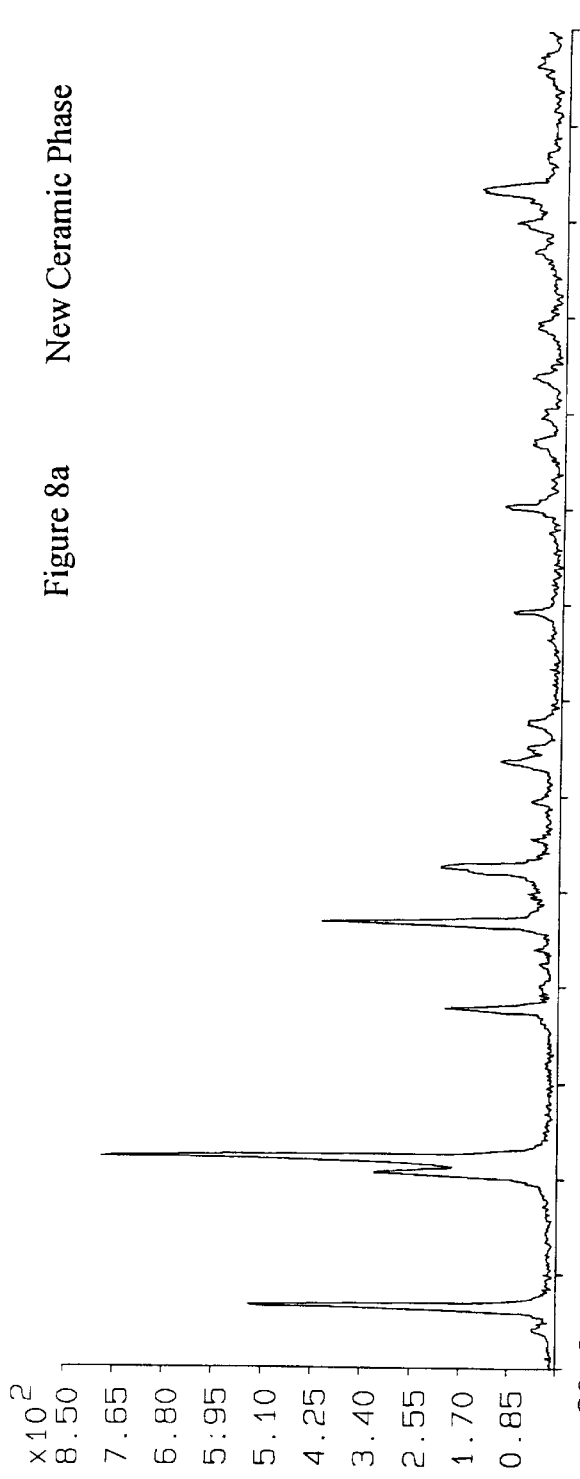
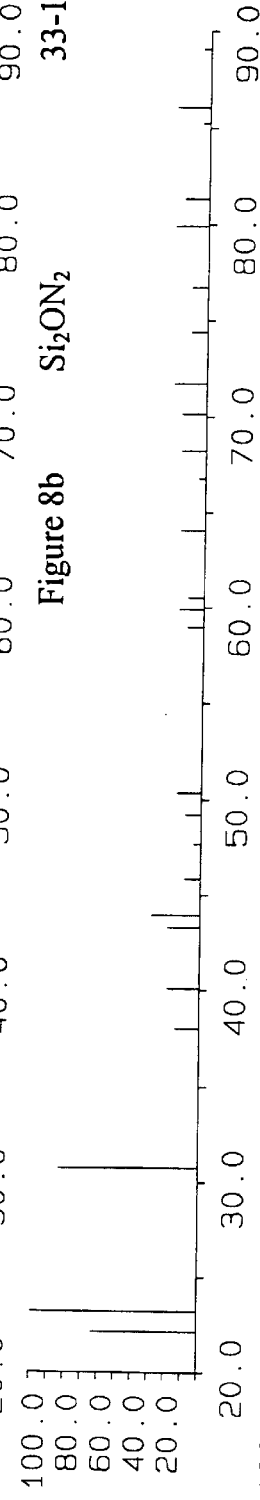
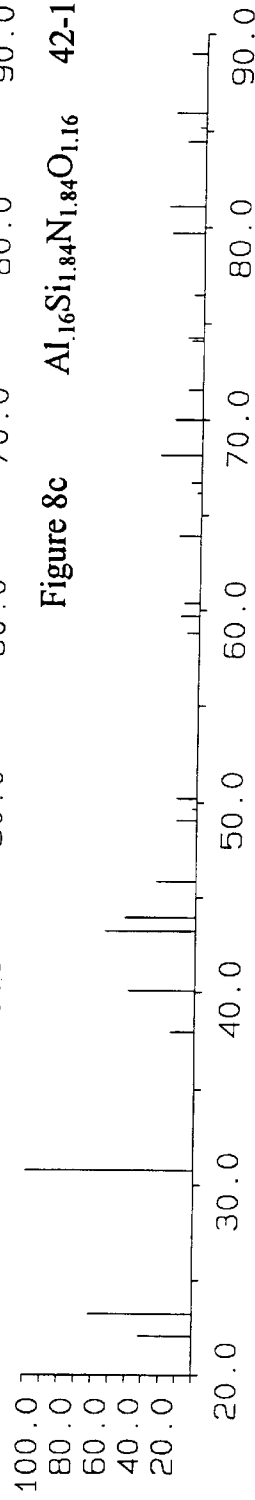
Figure 8a  New Ceramic Phase
Figure 8b  $Si_2ON_2$  33-1162
Figure 8c  $Al_{.16}Si_{1.84}N_{1.84}O_{1.16}$  42-1491

| NEW MATERIAL d(Å) | I | $Si_6Al_{O_6}N_5$ d(Å) | I | h k l |
|---|---|---|---|---|
| 4.422 | 66 | 4.427 | 70 | 3 1 1 |
| 3.414 | 39 | 3.389 | 50 | 4 2 0 |
| 3.329 | 100 | 3.308 | 100 | 203, 421 |
| 2.686 | 24 | 2.653 | 20 | 432, 114 |
| 2.416 | 51 | 2.379 | 40 | 314, 532 |
|  |  | 2.306 | 6 | 3 2 4 |
| 2.273 | 26 | 2.229 | 15 | 4 0 4 |

Figure 13

| Raw Mixtures (%) | | | Target Composition | | | | XRD Peak Intensity for Most Intense Peak (Counts) | | | | | | |
|---|---|---|---|---|---|---|---|---|---|---|---|---|---|
| kaolin | Si | SiO2 | Si | Al | O | N | Quartz | Mullite | a-Si3N4 | β-Si3N4 | X-phase | O'-sialon | New Phase |
| 39.7 | 35.8 | 24.6 | 6 | 1 | 6 | 5 | 13 | 32 | 31 | | | 21 | 403 |
| 30.8 | 50.0 | 19.1 | 1.8 | 0.2 | 1.2 | 1.8 | | | 11 | 27 | | 45 | 655 |
| 34.3 | 65.7 | 0.0 | 1.8 | 0.2 | 0.718 | 2.121 | | | 105 | 203 | | 58 | 473 |
| 28.2 | 38.1 | 33.8 | 1.8 | 0.2 | 1.65 | 1.5 | 20 | 17 | 8 | 11 | | 29 | 459 |
| 25.9 | 28.0 | 46.0 | 1.8 | 0.2 | 2.1 | 1.2 | 131 | 18 | 9 | | | 14 | 314 |
| 73.0 | 27.0 | 0.0 | 1.511 | 0.585 | 2.1 | 1.2 | | 70 | 81 | | | 27 | 381 |
| 50.7 | 49.3 | 0.0 | 1.699 | 0.334 | 1.2 | 1.8 | | 17 | 56 | | | 37 | 472 |
| 57.0 | 43.0 | 0.0 | 1.614 | 0.386 | 1.386 | 1.614 | | 34 | 87 | | 10 | 30 | 377 |
| 29.4 | 43.8 | 26.8 | 1.8 | 0.2 | 1.425 | 1.65 | | 9 | 7 | 64 | 17 | 37 | 543 |
| 32.5 | 57.5 | 10.0 | 1.8 | 0.2 | 0.959 | 1.961 | | | 25 | 142 | | 65 | 563 |
| 43.0 | 57.0 | 0.0 | 1.75 | 0.267 | 0.959 | 1.961 | | | 60 | 140 | 9 | 49 | 505 |
| 63.0 | 37.0 | 0.0 | 1.605 | 0.46 | 1.65 | 1.5 | | 36 | 50 | 39 | 6 | 20 | 409 |
| 0.0 | 58.4 | 41.6 | 2 | 0 | 1 | 2 | 46 | | 139 | 19 | | 225 | 617 |
| 15.8 | 54.1 | 30.1 | 1.9 | 0.1 | 1.1 | 1.9 | | | 15 | 31 | | 50 | 665 |
| 44.2 | 46.4 | 9.4 | 1.707 | 0.293 | 1.293 | 1.707 | 13 | 20 | 43 | 52 | 12 | 37 | 496 |
| 49.9 | 27.5 | 22.6 | 1.656 | 0.393 | 2.1 | 1.2 | | 51 | 40 | | | 14 | 338 |
| 43.2 | 43.4 | 13.4 | 1.707 | 0.293 | 1.406 | 1.632 | | 16 | 31 | 46 | | 27 | 480 |

CERAMIC MATERIAL

TECHNICAL FIELD

The present invention relates to a new ceramic material, and in particular a new silicon oxynitride ceramic.

BACKGROUND ART

To date only one intermediate compound in the $SiO_2$—$Si_3N_4$ system has been recognised. This compound is known as silicon oxynitride and has the chemical formula: $Si_2N_2O$. It was first reported by Schumb and Lefevre (*J. Am. Chem. Soc.* 76, 5882) in 1954, and its composition and structure were confirmed by Idrested and Brosset (*Acta Chem. Scand.* 18, 1879) in 1964.

More recently, Jack and Trigg (U.S. Pat. No. 4506021, 1985) have shown that this $Si_2N_2O$ structure can accommodate small amounts of aluminium by substituting equal amounts of aluminium and oxygen for silicon and nitrogen respectively. This results in a solid solution of general formula: $Si_{2-x}Al_xO_{1+x}N_{2-x}$, where x ranges from 0 to 0.2 at 1600° C., and can be as high as 0.4 at 1900° C. This silicon aluminium oxynitride solid solution is referred to as O'—SiAlON. $Si_2N_2O$ can be regarded as the x=0 end-member of the O'—SiAlON solid solution.

Silicon oxynitride and O'—SiAlON have an orthorhombic crystal structure. For silicon oxynitride this structure is made up of $SiN_3O$ tetrahedra, linked together to give a series of parallel puckered sheets of Si-N atoms separated by Si—O—Si bonds. Substitution of Al and O for Si and N in O'—SiAlON results in an increase in the size of the unit cell (Lindqvist, Sjöberg, Hull and Pompe, *Acta Cryst.* (1991) B47, 672), but there does not appear to be any ordering of the replacing atoms. Unit cell dimensions:

a=8.8807–8.9254 Å b=5.4965–5.4988 Å for $Si_{2-x}Al_xO_{1+x}N_{2-x}$ for x=0–0.4, Z=4 c=4.8550–4.8596 Å Lindqvist, Sjöberg, Hull and Pompe (1991)

The X-ray powder diffraction (XRD) patterns reported for $Si_2N_2O$ and O'SiAlON (x=0.16) in the ICDD data base (patterns 33–1162 and 42–1491) are listed in FIG. 2. As aluminium is substituted into the silicon oxynitride structure, expansion of the unit cell causes a slight overall shift of the X-ray diffraction peak positions to lower angles. Aside from this, because there is no real structural change, the X-ray powder diffraction patterns reported for $Si_2N_2O$ and O'—SiAlON are almost identical.

$Si_2N_2O$ and O'—SiAlON belong to a broader family of silicon aluminium oxynitride ($Si_wAl_xO_yN_z$) compounds or SiAlONs. Like most SiAlONs, $Si_2N_2O$ and O'—SiAlON exhibit useful engineering properties such as high strength and hardness, low density, and excellent wear, corrosion and heat resistance. $Si_2N_2O$ and O'—SiAlON are also particularly resistant to oxidation and thermal shock. Because of these properties, silicon oxynitride is commonly used as a refractory material.

Common methods for preparing $Si_2N_2O$ and O'—SiAlON are:

(i) Reaction Sintering of mixtures of two or more of the following: $Si_3N_4$, $SiO_2$, $Si_2N_2O$, $Al_2O_3$ and AlN, at $\geq 1600°$ C. under a nitrogen atmosphere, usually in the presence of a rare earth sintering aid such as $Y_2O_3$ or $CeO_2$. eg:

$$SiO_2 + Si_3N_4 = 2\ Si_2N_2O \quad (1)$$

$$0.9\ SiO_2 + 0.9\ Si_3N_4 + 0.2\ Al_2O_3 = 2\ Si_{1.8}Al_{0.2}O_{1.2}N_{1.8} \quad (2)$$

(ii) Carbothermal Reduction. Silica or an aluminosilicate mineral is blended with carbon and fired at $\geq 1350°$ C. under a flowing nitrogen atmosphere. This process is described as carbothermal reduction because the carbon acts by reducing the silica or aluminosilicate, allowing nitridation to occur. This method involves stopping a reaction at a specific point prior to complete nitridation. eg:

$$3\ C + 2\ SiO_2 + N_2 = Si_2N_2O + 3\ CO \quad (3)$$

$$2.7\ C + 0.1\ (Al_2O_3 \cdot 2\ SiO_2) + 1.6\ SiO_2 + 0.9\ N_2 = Si_{1.8}Al_{0.2}O_{1.2}N_{1.8} + 2.7\ CO \quad (4)$$

kaolin clay O'—SiAlON (x=0.2)

(iii) Silicothermal Reduction. Silicon metal powder is blended with silica and fired at >1350° C. under a flowing nitrogen atmosphere:

$$3\ Si + SiO_2 + 2\ N_2 = 2Si_2N_2O \quad (5)$$

Recently we have shown that it is possible to prepare O'—SiAlON by using clay as a source of aluminium in this reaction (PCT/NZ95/00050). Some silica may still be required to achieve the appropriate stoichiometry. eg.:

$$1.35\ Si + 0.1\ (Al_2O_3 \cdot 2\ SiO_2) + 0.25\ SiO_2 + 0.9\ N_2 = Si_{1.8}Al_{0.2}O_{1.2}N_{1.8} \quad (6)$$

kaolin clay O'—SiAlON (x=0.2)

Route (i) is very slow and requires very high temperatures, and it is very difficult to produce phase pure $Si_2N_2O$ and O'—SiAlON by route (ii). It is also extremely difficult to produce phase pure $Si_2N_2O$ by route (iii), but when clay is used, the reaction proceeds much more readily and relatively pure O'—SiAlON can be obtained.

Now we have shown that if we perform this reaction at lower temperatures (<1300° C.), particularly with the aid of additives such as $Fe_2O_3$, $Cu_2O$, $ZrO_2$ and $ZrSiO_4$, and partial pressures of hydrogen gas, we can isolate a new phase, which we believe to be a low temperature silicon oxynitride phase.

The X-ray diffraction pattern of this new phase (FIG. 1) has similarities to those of $Si_2N_2O$ and O'—SiAlON (FIG. 2), which suggest a similar structure. It is also very similar to that of $Si_6AlO_6N_5$ (ICDD file no. 46-382, C. Yamagishi, Tokyo Institute of Technology, Ph. D. Dissertation, (1994), see FIG. 11). $Si_6AlO_6N_5$ was isolated as an intermediate in the carbothermal synthesis of β-SiAlON ($Si_{6-z}Al_zO_zN_{8-z}$, z=0–4.2) from a non-crystalline $Al_2O_3$—$SiO_2$—C mixture:

$$10\ SiO_2 + Al_2O_3 + 11\ C + 7\ N_2 \rightarrow 2\ Si_5AlON_7 + 10\ CO_2 + CO$$

β-SiAlON (z=1)

The similarity in the XRD patterns of $Si_6AlO_6N_5$ and the new phase suggests that they are structurally related, but there is sufficient evidence to indicate that these are discrete phases:

(i) The new phase has a larger unit cell which could be due to isomorphous substitution of Al and O for Si and N in the $Si_6AlO_6N_5$ structure. This does not fit with the relationship between the composition proposed by Yamagishi ($Si_6AlO_6N_5$), and our evidence that the new phase is a low temperature polymorph of O'—SiAlON ($Si_{1.8}Al_{0.2}O_{1.2}N_{1.8}$).

(ii) Yamagishi has indexed the XRD pattern for $Si_6AlO_6N_5$ in the tetragonal P space group, but these indices cannot be satisfactorily matched to the pattern for the new material. This suggests that these species are not isostructural.

(iii) We have been unable to observe any significant shift in the XRD peak positions of the new phase in reaction mixtures with a wide range of compositions (including a "$Si_6AlO_6N_5$" composition), with and without additives (example 6). We have also found no evidence of $Si_6AlO_6N_5$ in any of our reactions.

An object of the invention is to provide a new ceramic material and to provide a method for the manufacture of that material.

SUMMARY OF THE INVENTION

The invention comprises a silicon oxynitride ceramic material characterised by the following relative intensities and d spacings for the most intense X-ray powder diffraction peaks:

| dÅ | I |
|---|---|
| 4.421 | 66 |
| 3.414 | 39 |
| 3.329 | 100 |
| 2.686 | 24 |
| 2.416 | 51 |
| 2.273 | 26 |

The invention also comprises a silicon oxynitride ceramic material characterised by the X-ray powder diffraction trace as shown in FIG. 1.

Preferably the silicon oxynitride ceramic material is characterised by the X-ray powder diffraction trace as shown in FIG. 1 and by the following relative intensities and d spacings for the most intense peaks:

| dÅ | I |
|---|---|
| 4.421 | 66 |
| 3.414 | 39 |
| 3.329 | 100 |
| 2.686 | 24 |
| 2.416 | 51 |
| 2.273 | 26 |

In a second embodiment, the invention comprises a process for the preparation of a silicon oxynitride ceramic material characterised by the X-ray powder diffraction trace of FIG. 1 and/or having the following relative intensities and d spacings for the most intense X-ray powder diffraction peaks:

| dÅ | I |
|---|---|
| 4.421 | 66 |
| 3.414 | 39 |
| 3.329 | 100 |
| 2.686 | 24 |
| 2.416 | 51 |
| 2.273 | 26 | the process comprising preparing a mixture of clay, silicon, and silica; and heating the mixture in a nitrogen containing atmosphere at a temperature of between about 1100° C. and about 1350° C. for a time sufficient to form the ceramic material.

Preferably the temperature is between about 1100° C. and about 1300° C.

Preferably the temperature is between about 1200° C. and about 1300° C.

Preferably the temperature is about 1250° C.

Preferably the time for which the mixture is heated is between about 4 hours and about 15 hours and more preferably between about 7 hours and about 12 hours and most preferably about 8 hours.

Preferably the heating rate is less than about 10° C. per minute and more preferably between about 1° C. and about 5° C. per minute.

Preferably the nitrogen containing atmosphere is a flowing atmosphere of nitrogen gas, ammonia, or a mixture of nitrogen and hydrogen gases, or a mixture of nitrogen and ammonia gases.

Preferably the clay is a hydrated layer aluminosilicate.

Preferably the starting materials in the mixture are in fine powder form.

Preferably the mixture further include an additive selected from $ZrO_2$, $Fe_2O_3$, $Cu_2O$, $ZrSiO_4$ or mixtures thereof.

Preferably the atmosphere flow rate is between 3 and 20 ml. $min^{-1}$ $g^{-1}$ by weight of silicon in the mixture.

Preferably the process for the preparation of the silicon oxynitride ceramic material comprises:

(a) preparing a starting mixture containing a hydrated layer aluminosilicate material, silicon, and silica, plus the optional inclusion of $ZrO_2$, $Fe_2O_3$, $Cu_2O$, $ZrSiO_4$ or mixtures thereof;

(b) heating the starting mixture at a temperature of between about 1200° C. and about 1300° C., in a flowing nitrogen atmosphere or flowing nitrogen and hydrogen atmosphere, for between 7 and 12 hours; and (c) collecting the ceramic material.

DRAWINGS

The figures show various XRD results which detail parameters of the invention. In the figures:

FIG. 1 X-ray powder diffraction trace of the new ceramic. Peaks due to phases other than the new material are labelled.

FIG. 2 Relative intensities and d spacings for the most intense X-ray powder diffraction peaks for the new ceramic, compared with reference data for $Si_2N_2O$ and O'—SiAlON (x=0.16) from the ICDD database.

FIG. 3 Reaction sequence for the O'—SiAlON reaction (reaction (6)). The intensity of the strongest XRD peak for each observed species is plotted versus firing temperature.

FIG. 4a, 4b, 4c Effect of $ZrO_2$ (FIG. 4b) and $Fe_2O_3$ (FIG. 4c) additives on the O'—SiAlON (FIG. 4a) reaction (reaction (6)). Additives are added at a level of 1.5 mol % cation by moles of O'—SiAlON product. Data points represent the intensity of the strongest XRD peak for each observed species.

FIG. 5 Effect of $Fe_2O_3$ additive on the $Si_2N_2O$ reaction (reaction (5)). Additives are added at a level of 1.5 mol % cation by moles of $Si_2N_2O$ product. Data points represent the intensity of the strongest XRD peak for each observed species.

FIG. 6 Mass change of the sample with composition for the O'—SiAlON reaction (reaction (6)). XRD results are shown for selected species.

FIG. 7 The effect of hydrogen partial pressures on the formation of the new ceramic.

FIGS. 8a, 8b and 8c X-ray powder diffraction trace of the new ceramic compared with reference patterns for $Si_2N_2O$ and O'—SiAlON from the ICDD database.

FIG. 9 Conversion of the new ceramic to O'—SiAlON at 1450° C. Data points represent the intensity of the strongest XRD peak for each observed species.

FIGS. 10a and 10b XRD traces of the new phase (FIG. 10a) and O'—SiAlON (FIG. 10b), formed by heating the new phase at 1450° C. for 6 h (*=attributed to the new phase, O=O'—SiAlON, M=mullite, B=β-phase, F=Fe$_3$Si).

FIG. 11 Relative intensities and d spacings for the most intense XRD peaks for the new phase, compared with reference data for Si$_6$AlO$_6$N$_5$ from the ICDD database.

FIG. 12 11.7T $^{29}$Si and $^{27}$Al MAS NMR spectra of the new phase (a and b), and O'—SiAlON (c and d). * denotes spinning side bands.

FIG. 13 Table showing different raw mixtures, target compositions and XRD analyses of resulting products.

FIGS. 14a and 14b Behavior diagram (FIG. 14a) showing the reaction products observed (by XRD) for different compositions (indicated by circles). Samples were fired at 1250° C. for 8 hours with 4.7% Fe$_2$O$_3$ and 90% nitrogen/10% hydrogen. This diagram is compared with the SiAlON phase diagram (FIG. 14b) at 1700° C. (after Bergman, Ekstrom and Micksi, J. Eur. Ceram. Soc. 8 (1991) 141).

FIG. 15 Thermal Expansion Curves for bars of the new phase and O'—SiAlON, heated at 3° C.min$^{-1}$ under flowing nitrogen

DETAILED DESCRIPTION OF THE INVENTION

The new ceramic is formed as an intermediate in the formation of O'—SiAlON by reaction (6). It appears early in the reaction sequence then slowly converts to O'—SiAlON at higher temperatures (>1350° C.) (examples 1, 2 and 4).

Figure 1:
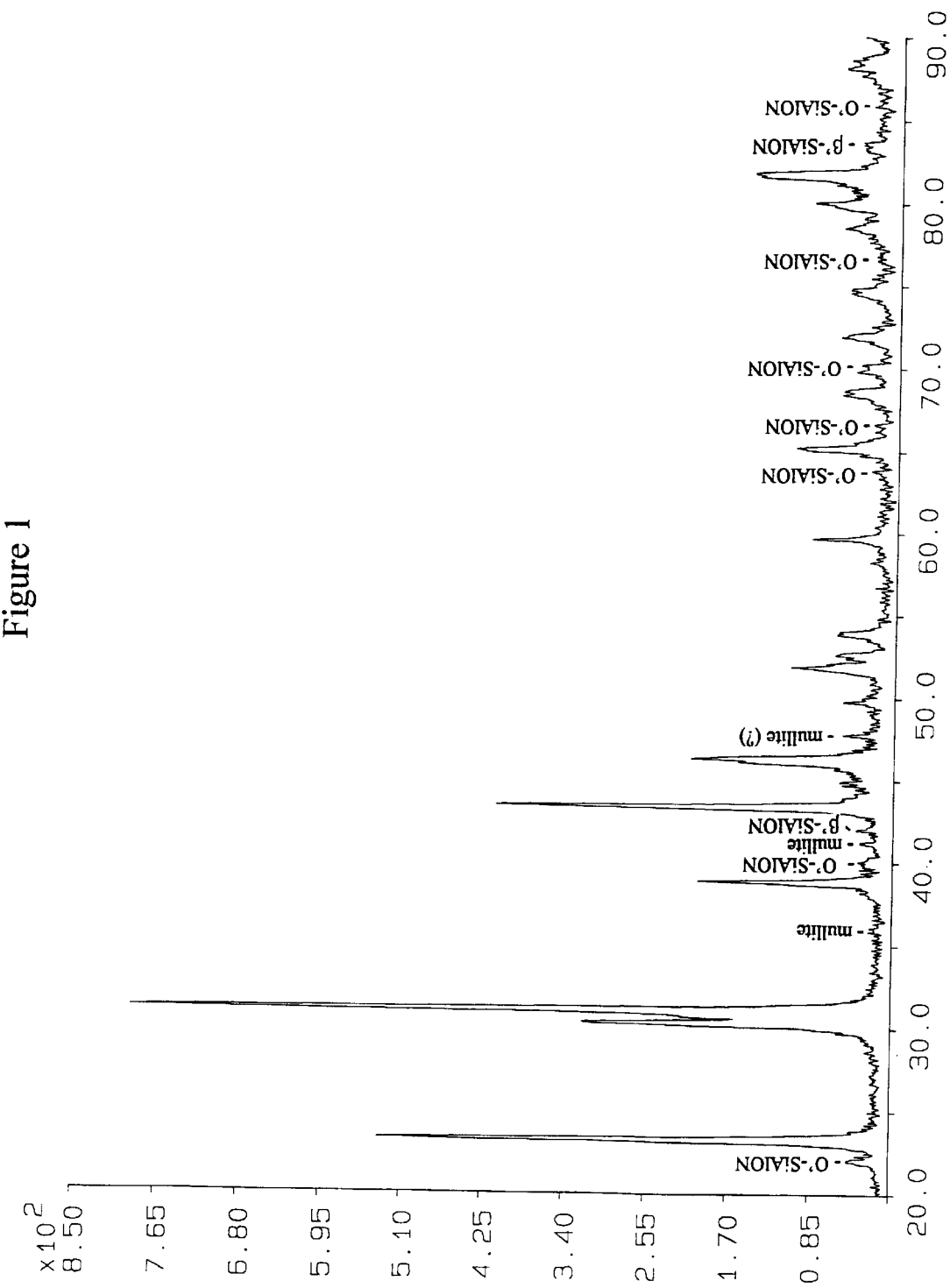

The new ceramic material is characterised by the X-ray powder diffraction pattern shown in FIG. 1, and by the positions and relative intensities of the six strongest diffraction peaks which are listed in FIG. 2. This pattern was obtained using Co Kα radiation and a Phillips 1700 series diffractometer controlled by Phillips APD1700 software. A Guinier camera was used to obtain accurate positions for the six strongest diffraction peaks. This trace also contains very small amounts of other SiAlON phases. These have been identified and labelled.

The diffraction pattern for this new ceramic is distinct from those of Si$_2$N$_2$O and O'—SiAlON, but there is an overall similarity which suggests that the structures are in some way related. It seems likely that the new ceramic is a low temperature polymorph of Si$_2$N$_2$O or O'—SiAlON, and that its structure is also composed of SiN$_3$O tetrahedra, but linked together with a different long range structure. If this is the case, a change in the symmetry of the unit cell could account for the apparent splitting of some silicon oxynitride peaks and the apparent merging of others.

The X-ray diffraction trace in FIG. 1 was obtained by using a mixture of clay, silicon and silica, which if fired under appropriate conditions, would give O'—SiAlON with x=0.2 by reaction (6). The new ceramic prepared from this mixture may therefore contain an amount of aluminium, but aluminium does not need to be present; the new phase was also observed in the formation of Si$_2$N$_2$O by reaction (5) (example 2). It is possible that the new ceramic is also a solid solution with small amounts of aluminium and oxygen substituting for silicon and nitrogen in a silicon oxynitride structure, but as yet there is no clear evidence for this. No significant shift has been detected in the X-ray diffraction peak positions to indicate aluminium substitution.

The extent of reactions (5) and (6) can be monitored by the change in weight of the sample. As the reaction proceeds, nitrogen from the atmosphere is incorporated into the ceramic and this causes an increase in mass. In example 2, the sample mass reaches a maximum with the formation of the new ceramic, and then there is no significant change in mass as this new ceramic disappears and O'—SiAlON forms. Also, a sample of the new ceramic will convert to O'—SiAlON without the significant appearance or disappearance of other phases (example 5). These facts support the suggestion that the composition of the new ceramic is very similar to that of O'—SiAlON, and the transformation from the new ceramic to O'—SiAlON may be a simple structural rearrangement from a low temperature to a high temperature form of O'—SiAlON.

By varying the composition of the reaction mixture in example 6, we have confirmed that the stable composition range for the new phase at 1250° C. is almost identical that of O'—SiAlON at higher temperatures. $^{27}$Al and $^{29}$Si MAS NMR for the new phase are compared with spectra for O'—SiAlON in FIG. 12. The overall similarity of the $^{27}$Al and $^{29}$Si NMR spectra for these two materials indicates that there are similarities in the cation coordination environments.

The $^{29}$Si spectrum for the new phase shows resonances at −61 and −113 ppm. The principal peak at −61 ppm matches the single shift observed for O'—SiAlON (−62 ppm), and can be assigned to tetrahedral SiN$_3$O units. The position and shape of the second shift at around −113 ppm are indicative of amorphous uncombined SiO$_2$.

Two main peaks are observed in the $^{27}$Al spectrum of both the new phase and O'—SiAlON. The peak at around 0 ppm is consistent with octahedrally coordinated aluminium. For O'—SiAlON, this resonance has been attributed to small amounts of Al-rich secondary phases (J. Sjöberg, R. K. Harris and D. C. Apperley, J. Mater. Chem. 2 (1992) 433). Although this peak represents a large proportion of the Al, the total amount of aluminium involved is small. For the new phase, this peak may also be due to secondary phases. The other peak at around 60 ppm can be assigned to tetrahedral AlO$_x$N$_{4-x}$ units, in accord with Sjöberg et al. The similarity of this peak in both materials suggests that Al is present in the new phase, but this evidence is not conclusive due to the interference of secondary phases.

Figure 7:
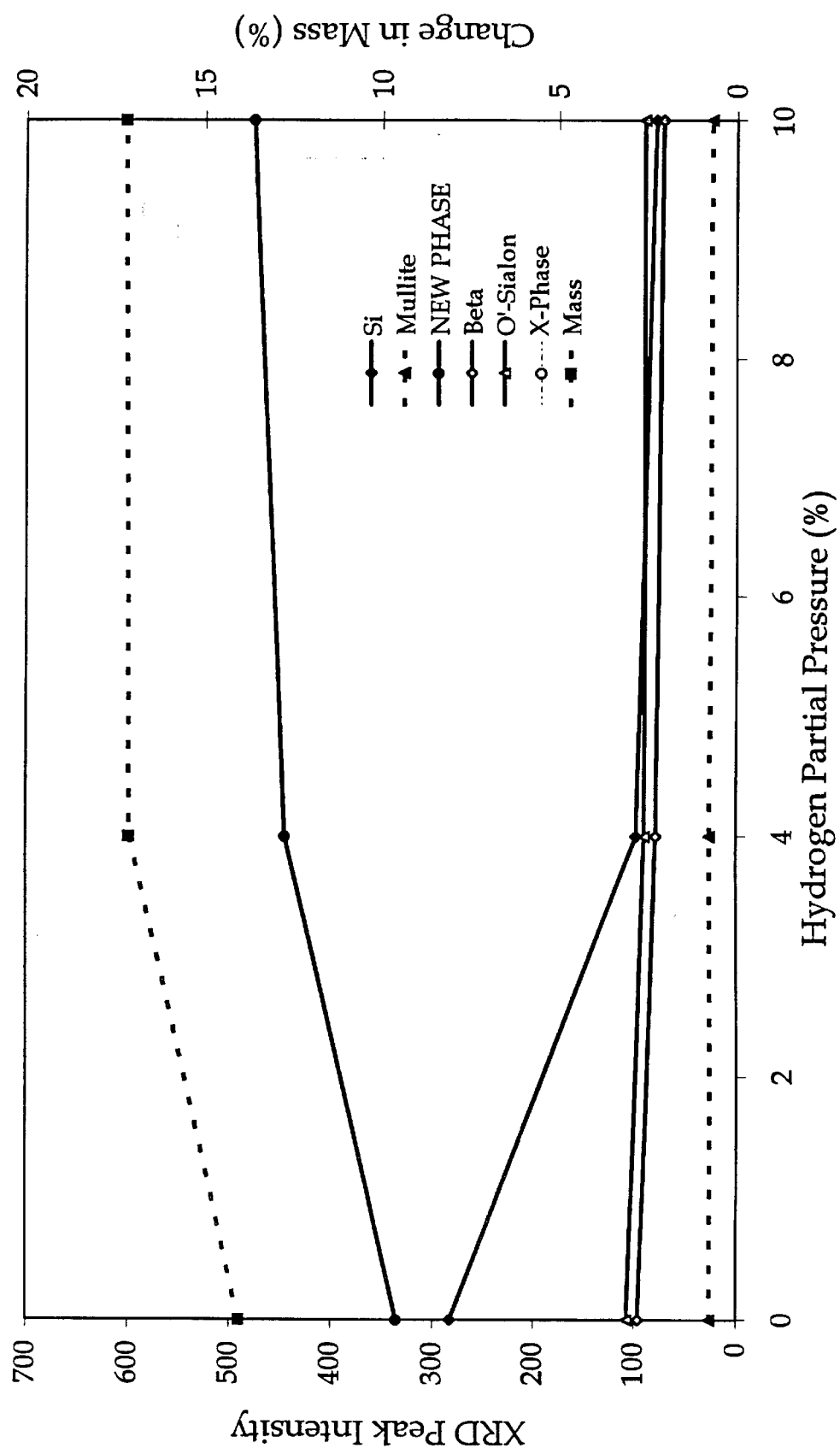

Additives such as ZrO$_2$, Fe$_2$O$_3$, Cu$_2$O, ZrSiO$_4$ have been found to enable both reactions (5) and (6) to proceed at lower temperatures (examples 2 and 3) and thus promote the formation of the new ceramic. At these lower temperatures it becomes easier to isolate the new ceramic. There is no evidence that the additives are incorporated into the structure of the new ceramic. They are thought to end up in the form of an iron silicide (Fe$_3$Si) (FIG. 10) or as an aluminosilicate glass accompanying the new ceramic. It is envisaged that other additives will also have a similar effect. The use of partial pressures of hydrogen gas in the nitrogen atmosphere have also been found to initiate the reaction at lower temperatures and thus will have a beneficial effect on the process (see FIG. 7).

The new ceramic may be prepared using silicon metal, clay, silica, additives to promote the reaction, and nitrogen (N$_2$) gas or a mixture of nitrogen (N$_2$) and hydrogen (H$_2$) gases. Ammonia (NH$_3$) may be used as an alternative. The solid raw materials should preferably be in fine powder form, as will be known in the art, and the clay may be dehydroxylated prior to use by methods such as precalcining as will again be known in the art. The raw materials should then be blended in ratios appropriate to form Si$_2$N$_2$O or O'—SiAlON (see previous reactions (5) and (6)) as will be known in the art. The raw materials may be blended by ball milling or other standard techniques as are well known in the art. The dry mixture can be fired as a powder or, if the clay has not been pre-dehydroxylated, formed into shapes utilising the malleability of the clay component by methods such as pressing, slip casting or extruding, as will be known in the art.

The nitrogen flow rate should be as low as possible, but should be sufficient to replace nitrogen consumed by the reaction, and maintain an atmosphere with preferably $\leq 0.5\%$ oxygen and preferably $\leq 0.5\%$ water vapour (more preferably $\leq 10$ ppm $O_2$ and $\leq 25$ ppm water vapour) inside the furnace or kiln. The flowing nitrogen atmosphere is preferably pure nitrogen however may contain up to about 20% $H_2$. Preferably the $H_2$ content is up to 10% and more preferably between 4% and 10%. As an alternative, ammonia ($NH_3$) gas may also be used as the flowing atmosphere as a source of nitrogen and hydrogen for the reaction. A mixture of ammonia and nitrogen gases may also be used if desired. For the sample sizes as used in the examples, nitrogen flow rates of between about 3 and 20 ml. $min^{-1}$ $g^{-1}$ by weight of silicon in the sample were found to suffice, however this will be adjusted as needed as will be known in the art. The oxygen and water vapour content of the atmosphere should be kept to a minimum as these factors can affect the process by attacking the unreacted silicon powder. During the reaction the nitrogen in the furnace atmosphere becomes incorporated into the product via a nitridation reaction giving an increase in weight. The product formed contains the new ceramic and may also contain silicon nitride, mullite, and other SiAlON phases.

The heating rate should preferably be less than about 10° C. per minute and more preferably between 1° C. and 5° C. per minute or between 2° C. and 5° C. per minute. The preferred temperature range to which the mixture of components is heated is between about 1200° C. and about 1300° C. as, at higher temperatures, the new ceramic appears to convert to O'—SiAlON. Temperatures as high as about 1500° C. may also be used and temperatures as low as about 1100° C. are envisaged as being possible. If the temperature at which the reaction is initiated is lower, there is a greater temperature window in which to form the new ceramic before it begins to convert to O'—SiAlON at temperatures about >1300° C. As mentioned previously additives such as $ZrO_2$, $Fe_2O_3$, $Cu_2O$, $ZrSiO_4$ and partial pressures of $H_2$ in the flowing gas may facilitate the lower reaction temperatures. The time for which the material is held at top temperature is preferably between about 4 and about 15 hours, with between about 7 and about 12 hours or between about 8 and about 12 hours preferred.

As will be apparent to a person skilled in the art a variety of clays may be used in the process. Clays that can be used are the hydrated layer aluminosilicates generally. The preferred clays are the kaolin clays however the pyrophyllite and the montmorillonite clays, such as bentonite, may also be used. Other types of clays, such as illites for example, may also be used however most will contain a variety of impurities such as K, Na, Ca, Mg together with the aliminosilicate content. These impurities may detrimentally affect the purity of the new ceramic product formed by the process.

ADVANTAGES

The present invention is a totally new ceramic material and most of its properties are yet to be determined. The thermal expansion of the new phase is very similar to that of O'—SiAlON (example 7), and it seems likely that its other engineering properties will also be similar to those of O'—SiAlON. Therefore this new phase should be useful as a refractory or in other engineering applications. The greatest potential advantage of this material is that it forms at extremely low temperatures when compared with other nitride ceramics. If appropriate additives and conditions are used, this new ceramic will form at temperatures below 1300° C., and this should give a significant economic advantage over existing materials.

EXAMPLES

Example 1

This example shows the disappearance and appearance of various compounds, including the new phase, during the course of the O'—SiAlON reaction (reaction (6)).

A mixture of:

30.7% Precalcined BDH Light Kaolin Clay 50.1% Permascand 4D Silicon 19.2% Superfine Quartz Powder (supplied by Commercial Minerals Ltd)

Figure 3:
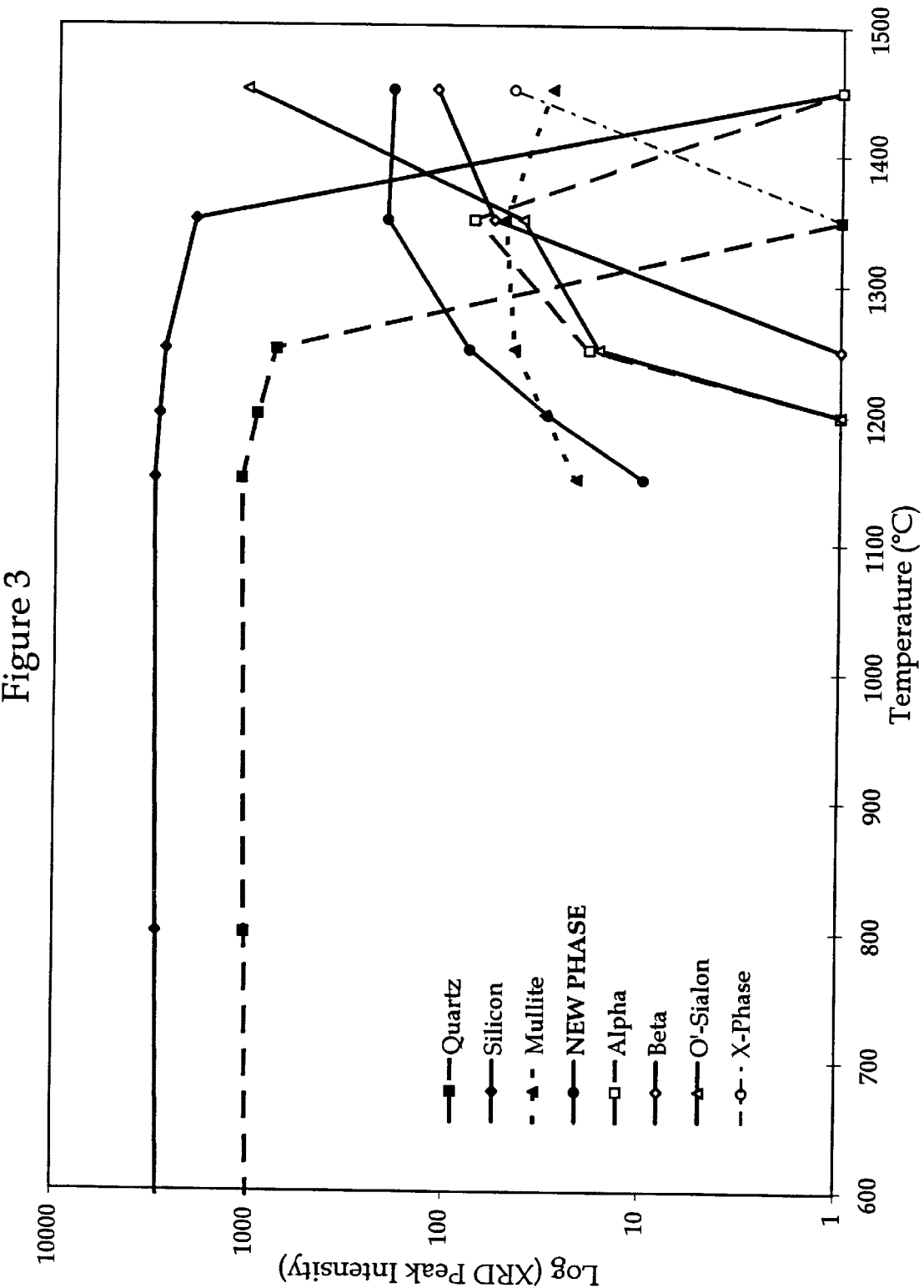

(24 g) was blended by ball-milling with ca. 900 g of 10 mm diameter $Si_3N_4$ balls and 70 g of hexane in a 1 litre HDPE bottle for 20 hours at ca 150 rpm. The hexane solvent was removed by rotary evaporation. The dried powder was pressed as pellets (10 mm diam, 0.5 g) and heated under a flowing nitrogen atmosphere (30 ml.$min^{-1}$.$g^{-1}$) at a rate of 2 deg.$min^{-1}$ to the following temperatures: 800° C., 1150° C., 1200° C., 1250° C., 1350° C. and 1450° C., and allowed to cool rapidly. The products from each firing were analysed by X-ray powder diffraction (XRD). The intensities of the strongest XRD peak for each species is plotted against temperature on a log scale in FIG. 3.

This graph shows the following features:

(i) mullite and the new ceramic both appear early in the reaction sequence (at about 1150° C.), and begin to disappear at 1450° C.

(ii) a small amount of $\alpha$-$Si_3N_4$ appears at about 1250° C., but disappears by 1450° C.

(iii) O'—SiAlON also appears at about 1250° C. and increases as the reaction proceeds (iv) and small amounts of $\beta$'-SiAlON and X-phase SiAlON appear towards the end of the reaction.

Example 2

This example illustrates the effect of additives: $ZrO_2$ and $Fe_2O_3$ on the O'—SiAlON and $Si_2N_2O$ reactions.

An O'—SiAlON reaction mixture containing:

30.7% Precalcined BDH Light Kaolin Clay 50.1% Permascand 4D Silicon 19.2% Superfine Quartz Powder (supplied by Commercial Minerals Ltd) and a $Si_2N_2O$ reaction mixture containing:

58.4% Permascand 4D Silicon 41.6% Superfine Quartz Powder (supplied by Commercial Minerals Ltd) were each ball-milled and dried as described in example 1. Similar mixtures were prepared containing 2.53% Tosoh TZ-0 $ZrO_2$ or 1.46% BDH $Fe_2O_3$ (equivalent to approximately 1.5 mol % of cation by moles of product). Samples of all six mixtures were pressed as pellets (10 mm diam, 0.5 g) and heated under a flowing nitrogen atmosphere (30 ml.$min^{-1}$.$g^{-1}$) at a rate of 2 deg.$min^{-1}$ to the following temperatures: 1100° C., 1150° C., 1200° C., 1250° C., 1300° C., 1350° C. and 1450° C., and held at those temperatures for 8 hours.

For the O'—SiAlON reaction mixtures, the results from XRD analyses of the products are plotted against temperature in FIG. 4. The optimum temperature for producing the new ceramic appears to be 1250° C. At higher temperatures the new ceramic converts to O'—SiAlON. $ZrO_2$ and $Fe_2O_3$ additives promote the formation of the new ceramic at lower temperatures, but do not promote the conversion to O'—SiAlON. This has allowed the new ceramic to be isolated in greater purity.

Figure 5:
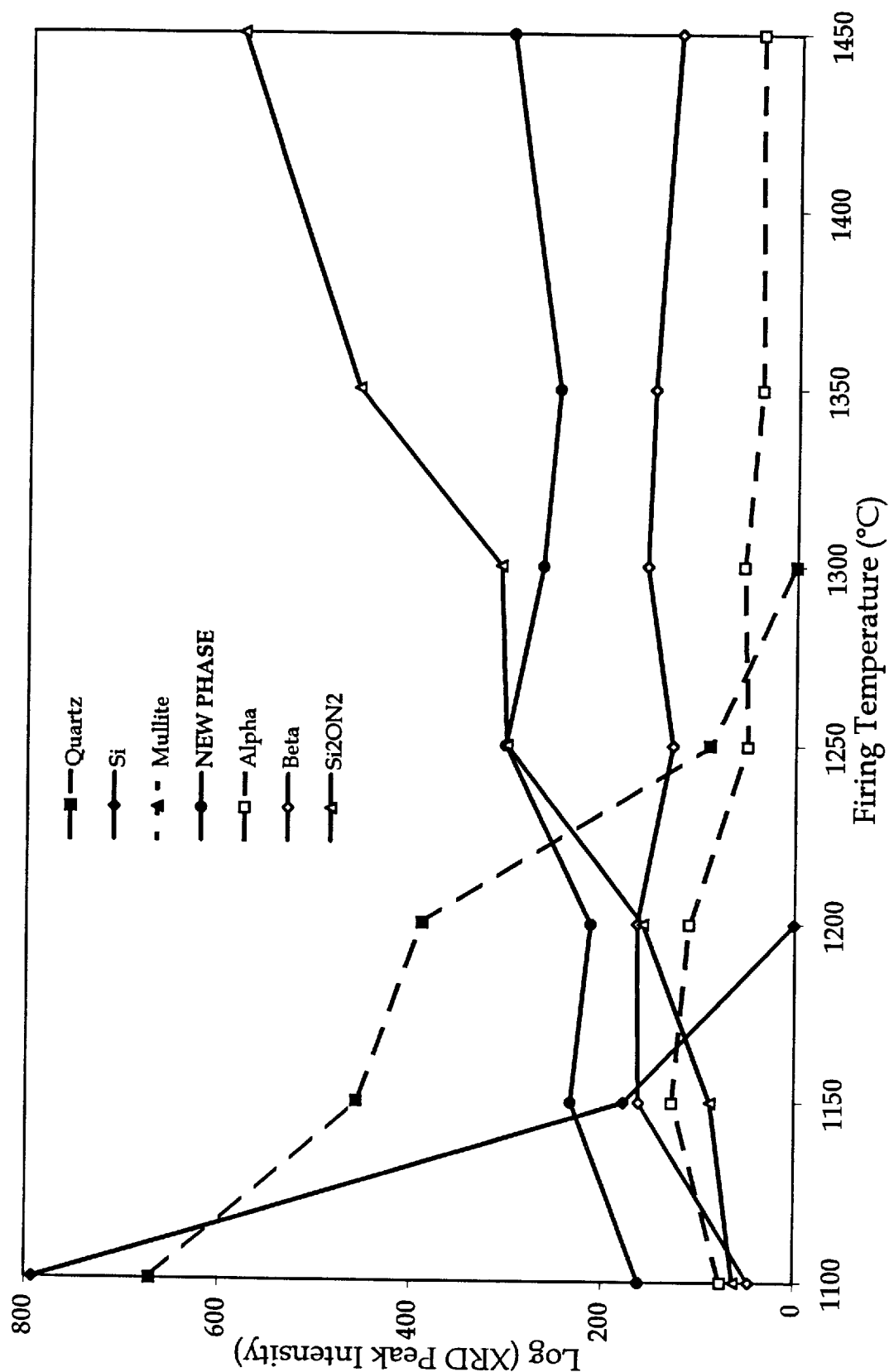

The new ceramic can also be observed in the $Si_2N_2O$ reaction, but it is more difficult to detect. This is probably because the reactions occur at higher temperatures. FIG. 5 shows XRD analyses of the products from the $Si_2N_2O$ mixture containing $Fe_2O_3$.

Figure 6:
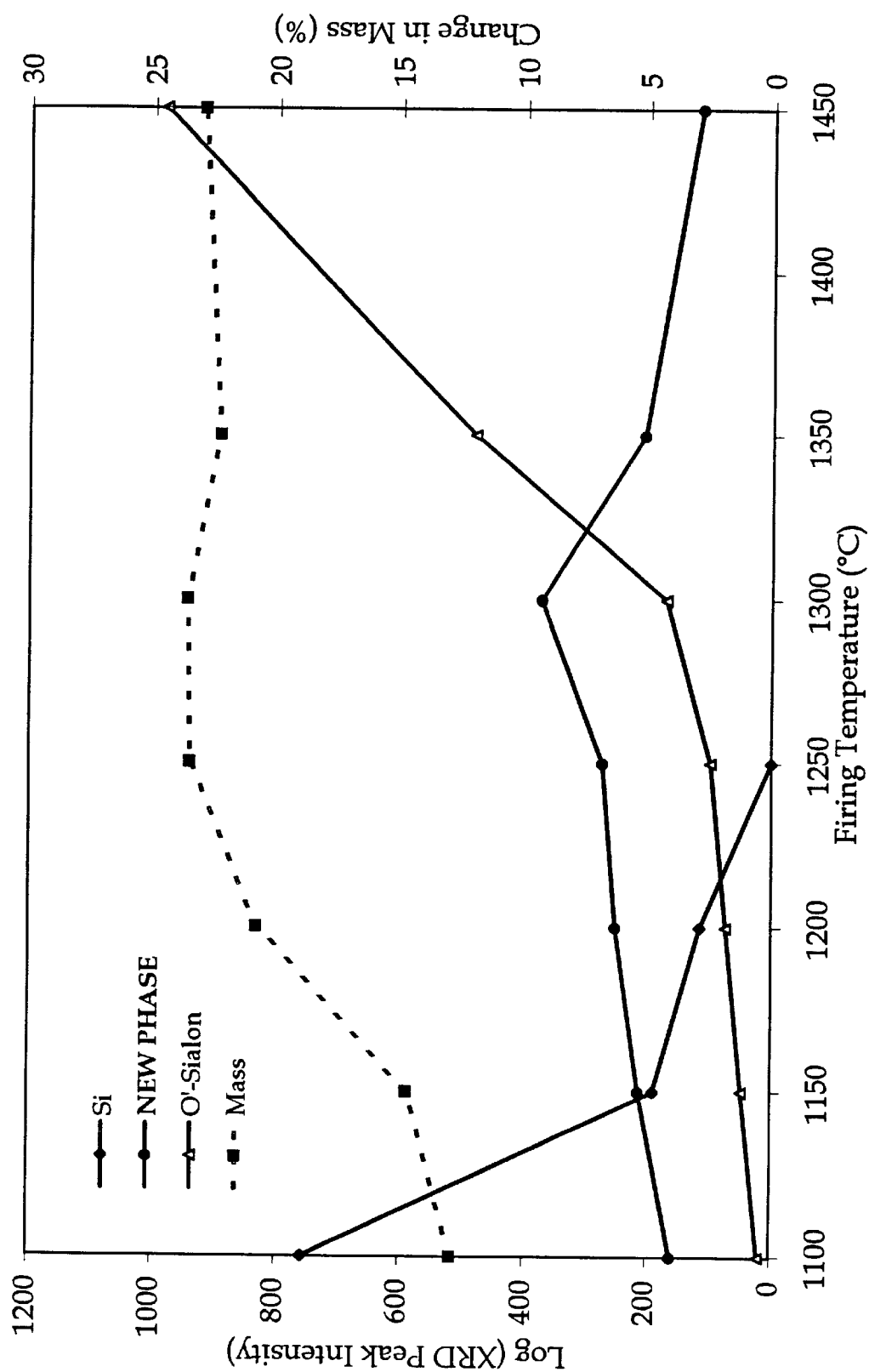

In FIG. 6, XRD analyses of the products from firings of the O'—SiAlON reaction mixture containing $ZrO_2$ are compared with the change in the mass of the sample. The mass increases as the silicon disappears and the new ceramic forms, but there is no significant change in mass as this converts to O'—SiAlON.

Example 3

This example shows the effect of partial pressures of hydrogen on the formation of the new ceramic material.

A mixture of:

30.7% precalcined BDH light kaolin clay 50.1% Permascand 4D silicon powder 19.2% superfine quartz powder was ball-milled and dried as described in example 1. Samples of this mixture were pressed as pellets (10 mm diam, 0.5 g) and heated at a rate of 2 deg.min$^{-1}$ to 1250° C. for 8 hours, under flowing atmospheres (30 ml.min$^{-1}$.g$^{-1}$) of (i) nitrogen, (ii) 96% nitrogen/4% hydrogen, and (iii) 90% nitrogen/ 10% hydrogen. The product of each firing was analysed by XRD, and the results are plotted against hydrogen partial pressure in FIG. 7.

Example 4

In this example a relatively pure sample of the new ceramic is prepared and analysed by X-ray powder diffraction and NMR spectrometry.

A mixture of:

29.3% precalcined BDH light kaolin clay 47.7% Permascand 4D silicon powder 18.3% superfine quartz powder 4.7% BDH ferric oxide ($Fe_2O_3$) (5 mol % by moles of O'—SiAlON) was ball-milled and dried as described in example 1. Samples of this mixture were pressed as pellets (10 mm diam, 0.5 g) and heated at a rate of 2 deg.min$^{-1}$ to 1250° C. for 8 hours, under a flowing atmosphere (30 ml.min$^{-1}$.g$^{-1}$) of 90% nitrogen/10% hydrogen.

An XRD trace of the product is shown in FIG. 1. The product is predominantly the new ceramic with trace amounts of other SiAlON phases, as indicated. This XRD trace is compared with the reference patterns for $Si_2N_2O$ and O'—SiAlON (x=0.16) in the ICDD database in FIG. 8. XRD peak positions, obtained using a Guinier camera, and relative intensities for the six strongest peaks are listed in FIG. 2. and compared with data for $Si_2N_2O$ and O'—SiAlON (x=0.16) from the ICDD database.

Figures 11, 12:
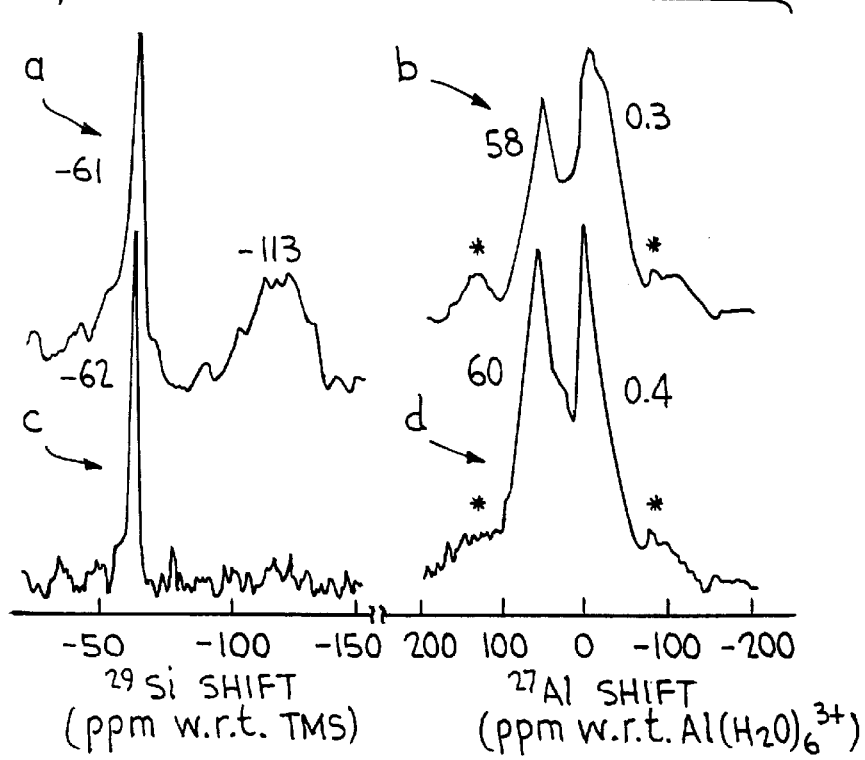

11.7T $^{27}$Al and $^{29}$Si MAS NMR for the new phase are compared with spectra for O"—SiAlON in FIG. 12. These spectra were obtained using a Varian Unity 500 spectrometer and a 5 mm high-speed Doty probe spun at 10–12 kHz. The $^{27}$Al spectra were acquired using a 1 µs π/10 pulse and a recycle delay of 5 s, the spectra being referenced to Al($H_2O$)$_6^{3+}$. The $^{29}$Si spectra were obtained using a 6 µs π/2 pulse and a recycle delay of 300 s, referenced to tetramethylsilane (TMS). The presence of iron in the sample of the new phase gives rise to spinning side bands in the NMR spectra, but does not significantly reduce the $^{29}$Si relaxation rate.

Example 5

This example shows the conversion of the new ceramic to O'—SiAlON at 1450° C.

Figure 9:
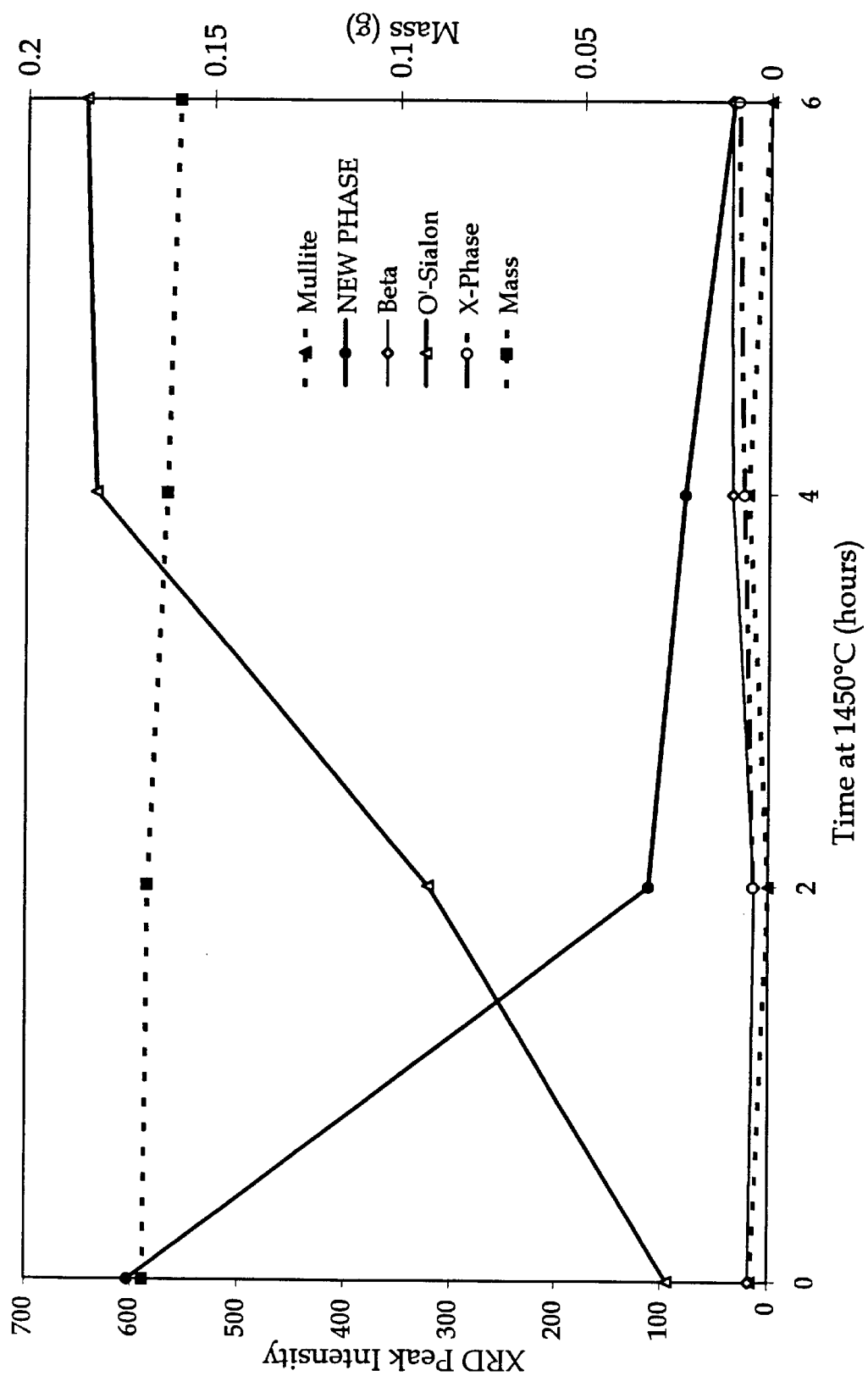
Figure 10A:
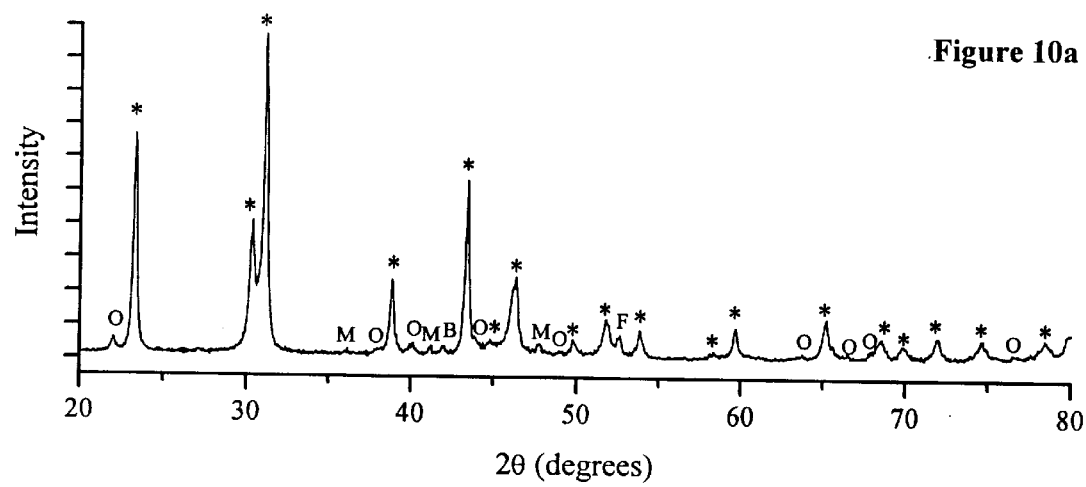
Figure 10B:
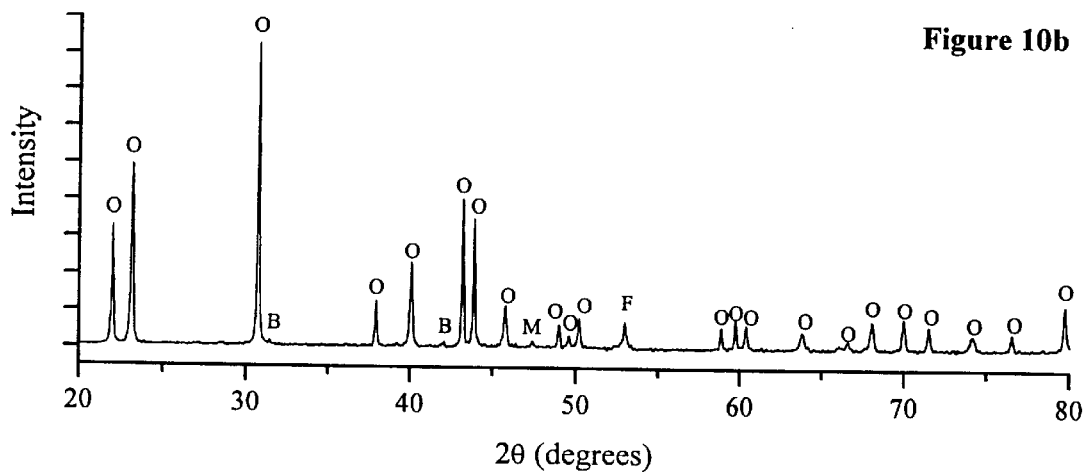

A powder sample of the new ceramic prepared using 4.7% $Fe_2O_3$ and 10% hydrogen (see example 4) was pressed into pellets (10 mm diam, 0.17 g). These pellets were heated under a flowing atmosphere (30 ml.min$^{-1}$.g$^{-1}$) of 90% nitrogen/10% hydrogen at 2 deg.min$^{-1}$ to 1450° C. for 2, 4, 6 and 8 hours. The product of each firing was analysed by XRD, and the results are plotted against hold time at 1450° C. in FIG. 9. XRD traces of the new compound and the O'—SiAlON product are shown in FIG. 10. Both of these XRD traces contain minor peaks representing iron silicide ($Fe_3Si$), derived from the $Fe_2O_3$ added to promote the initial formation of the new phase.

Example 6

This example shows the products which are formed when the composition of the raw mixture is varied. A behaviour diagram is constructed using this information.

Figure 14A:
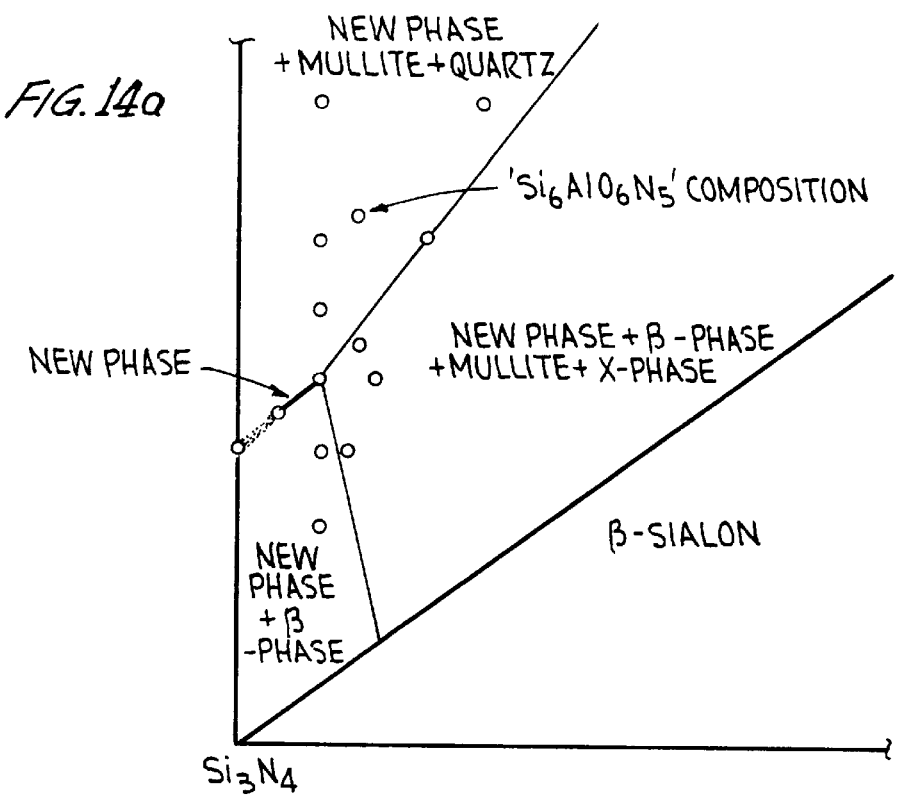
Figure 14B:
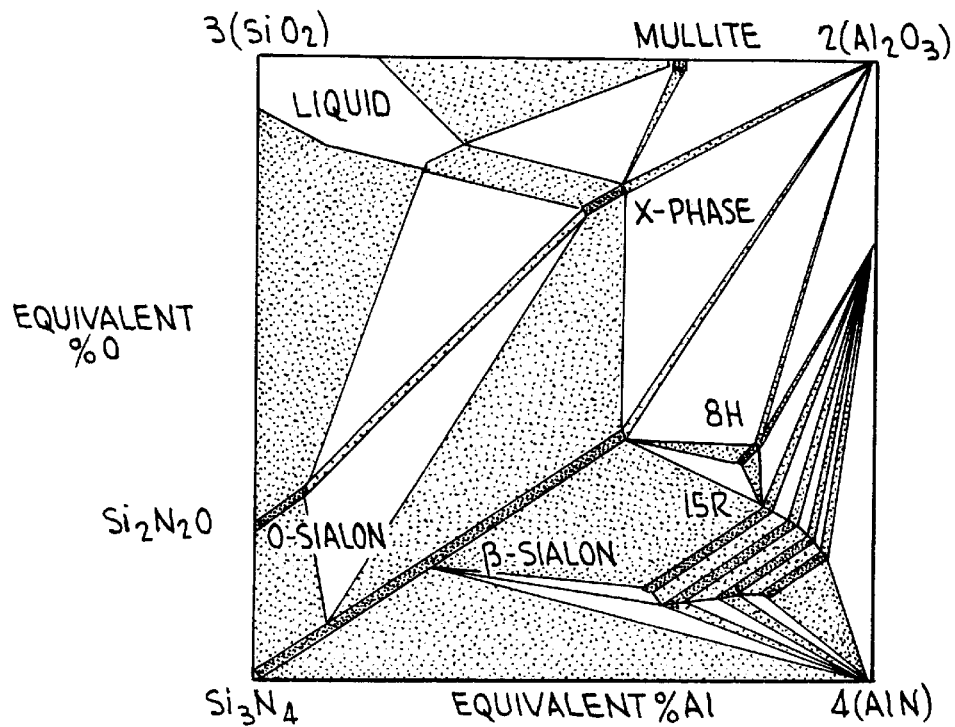

Mixtures were prepared containing varying amounts of precalcined BDH light kaolin clay, Permascand 4D silicon powder and superfine quartz powder, to give the fired compositions indicated in FIGS. 13 and 14 (this included a composition which would give the correct stoichiometry for $Si_6AlO_6N$). These mixtures were each ball-milled with 4.7% $Fe_2O_3$ and fired as pressed pellets at 1250° C. for 8 hours under 90% nitrogen/10% hydrogen, as described in example 4. The products from each mixture were analysed by XRD. The raw mixtures, target compositions and product XRD analyses are listed in FIG. 13, and a behaviour diagram was constructed showing the phases observed in the products at each composition (FIG. 14). Trace amounts of O'—SiAlON were also observed in all samples.

Near-pure new phase is obtained over a composition range which overlays the composition range of O'—SiAlON in the 1700° C. phase diagram. This confirms that the chemical compositions of O'—SiAlON and the new phase are very similar if not identical. $Si_6AlO_6N$ was not observed in any of the reaction products, and no shifts were detected in the XRD peak positions for the new phase.

Example 7

In this example, the thermal expansion of a bar of the new phase is measured and compared with that of an O'—SiAlON bar of comparable porosity and iron content.

A mixture of:

29.3% precalcined BDH light kaolin clay 47.7% Permascand 4D silicon powder 18.3% superfine quartz powder 4.7% BDH ferric oxide ($Fe_2O_3$) (5 mol % by moles of O'—SiAlON) was ball-milled and dried as described in example 1. Samples of this mixture were pressed as two bars (65×8×5 mm, 4.3 g, 5 MPa). Bar A was heated at a rate of 2 deg.min$^{-1}$ to 1450° C. for 12 hours, under a flowing nitrogen atmosphere (100 ml.min$^{-1}$). Analysis of the fired bar by XRD revealed predominantly O'—SiAlON with a small amount of iron silicide. Bar B was heated at a rate of 2 deg.min$^{-1}$ to 1250° C. for 12 hours, under a flowing atmosphere (100 ml.min$^{-1}$) of 90% nitrogen/10% hydrogen. XRD analysis of the fired bar showed predominantly O'—SiAlON with a small amount of iron silicide.

The apparent porosities of the two bars were measured by evacuation and water saturation:

Bar A (O'—SiAlON): 40.6% apparent porosity

Bar B (new phase): 42.0% apparent porosity

Figure 15:
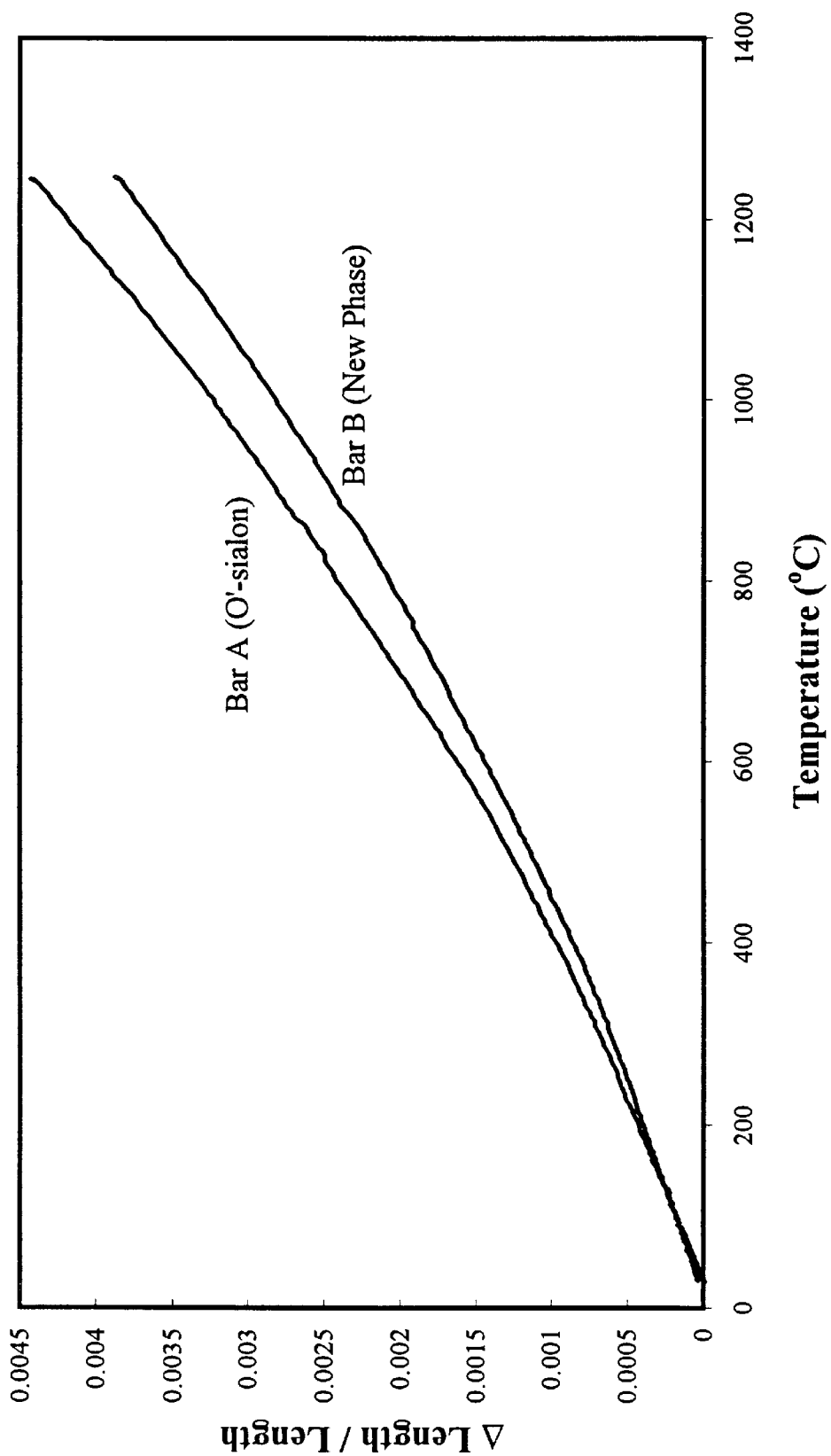

The thermal expansions of these bars were measured by heating at 3° C.min$^{-1}$ to 1300° C. under flowing nitrogen gas in a Harrop Laboratories TD1 dilatometer. Thermal expansion coefficients of 3.3×10$^{-6}$ °C.$^{-1}$ (25–1000° C.) for bar A (O'—SiAlON), and 2.9×10$^{-6}$ °C.$^{-1}$ (25–1000° C.) for bar B (new phase) were obtained from the thermal expansion curves in FIG. 15. A comparison with the mean thermal expansion of 3.3×10$^{-6}$ °C.$^{-1}$ (25–1000° C.) for phase pure fully-dense O'—SiAlON (Barris et al. IPENZ *Annual Conference Proceedings*, 2 (1996) 319) confirms that the porosity and the presence of iron are having negligible effect on the thermal expansion.

The foregoing describes the invention including preferred forms thereof. Alterations and modifications as will be obvious to a person skilled in the art are intended to be included within the spirit and scope of the invention as defined in the appended claims.

We claim:

1. A silicon oxynitride ceramic material comprising the following relative intensities and d spacings for the most intense X-ray powder diffraction peaks:

| dÅ | I |
|---|---|
| 4.421 | 66 |
| 3.414 | 39 |
| 3.329 | 100 |
| 2.686 | 24 |
| 2.416 | 51 |
| 2.273 | 26. |

2. A silicon oxynitride ceramic material comprising an X-ray powder diffraction trace as shown in FIG. 1.

3. A silicon oxynitride ceramic material comprising an X-ray powder diffraction trace as shown in FIG. 1 and the following relative intensities and d spacings for the most intense peaks:

| dÅ | I |
|---|---|
| 4.421 | 66 |
| 3.414 | 39 |
| 3.329 | 100 |
| 2.686 | 24 |
| 2.416 | 51 |
| 2.273 | 26. |

4. A process for the preparation of the silicon oxynitride ceramic material according to claim 1 comprising preparing a mixture of clay, silicon, and silica; and heating the mixture in a nitrogen containing atmosphere at a temperature of between about 1100° C. and about 1350° C. for a time sufficient to form the ceramic material.

5. A process for the preparation of the silicon oxynitride ceramic material according to claim 3 comprising preparing a mixture of clay, silicon, and silica; and heating the mixture in a nitrogen containing atmosphere at a temperature of between about 1100° C. and about 1350° C. for a time sufficient to form the ceramic material.

6. The process of claim 4 or 5 wherein the temperature is between about 1100° C. and about 1300° C.

7. The process of claim 4 or 5 wherein the temperature is between about 1200° C. and about 1300° C.

8. The process of claim 4 or 5 wherein the temperature is about 1250° C.

9. The process of claim 4 or 5 wherein the mixture is heated for between about 4 hours and about 15 hours.

10. The process of claim 4 or 5 wherein the mixture is heated for about 8 hours.

11. The process of claim 4 or 5 wherein the heating is at a rate less than about 10° C. per minute.

12. The process of claim if 4 or 5 wherein the heating is at a rate between about 1° C. and about 5° C. per minute.

13. The process of claim 4 or 5 wherein the nitrogen containing atmosphere is a flowing atmosphere of nitrogen gas, ammonia, a mixture of nitrogen and hydrogen gases, or a mixture of nitrogen and ammonia gases.

14. The process of claim 4 or 5 wherein the clay is a hydrated layer aluminosilicate.

15. The process of claim 4 or 5 wherein the clay, silicon and silica in the mixture are in fine powder form.

16. The process of claim 4 or 5 wherein the mixture further includes an additive selected from $ZrO_2$, $Fe_2O_3$, $Cu_2O$, $ZrSiO_4$ and mixtures thereof.

17. The process of claim 4 or 5 wherein the atmosphere is a flowing nitrogen atmosphere which flows at a rate between about 3 and 20 ml. min$^{-1}$g$^{-1}$ by weight of silicon in the mixture.

18. A process for the preparation of the silicon oxynitride ceramic material according to claim 1 comprising:

(a) preparing a starting mixture containing a hydrated layer aluminosilicate material, silicon, and silica, plus optionally including $ZrO_2$, $Fe_2O_3$, $Cu_2O$, $ZrSiO_4$ or mixtures thereof;

(b) heating the starting mixture at a temperature of between about 1200° C. and about 1300° C., in a flowing nitrogen atmosphere or a flowing nitrogen and hydrogen atmosphere, for between 7 and 12 hours; and (c) collecting the ceramic material.

* * * * *